US009247155B2

(12) United States Patent
Gupta et al.

(10) Patent No.: US 9,247,155 B2
(45) Date of Patent: Jan. 26, 2016

(54) METHOD AND SYSTEM FOR ROBUST SCENE MODELLING IN AN IMAGE SEQUENCE

(71) Applicant: CANON KABUSHIKI KAISHA, Tokyo (JP)

(72) Inventors: Amit Kumar Gupta, New South Wales (AU); Getian Ye, New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 13/718,216

(22) Filed: Dec. 18, 2012

(65) Prior Publication Data
US 2013/0162867 A1  Jun. 27, 2013

(30) Foreign Application Priority Data
Dec. 21, 2011 (AU) ................. 2011265429

(51) Int. Cl.
H04N 5/262 (2006.01)
H04N 5/272 (2006.01)
G06K 9/38 (2006.01)

(52) U.S. Cl.
CPC ............ H04N 5/2621 (2013.01); G06K 9/38 (2013.01); H04N 5/272 (2013.01); G06T 2207/20021 (2013.01); G06T 2207/20144 (2013.01)

(58) Field of Classification Search
None
See application file for complete search history.

(56) References Cited

U.S. PATENT DOCUMENTS

| 6,999,600 | B2 * | 2/2006 | Venetianer et al. | 382/103 |
| 7,418,134 | B2 * | 8/2008 | Schwartz et al. | 382/173 |
| 7,457,436 | B2 | 11/2008 | Paragios et al. | |
| 2004/0228530 | A1 * | 11/2004 | Schwartz et al. | 382/173 |
| 2004/0246336 | A1 * | 12/2004 | Kelly et al. | 348/143 |
| 2005/0180600 | A1 * | 8/2005 | Wu et al. | 382/103 |
| 2006/0171594 | A1 * | 8/2006 | Avidan et al. | 382/224 |
| 2007/0273765 | A1 * | 11/2007 | Wang et al. | 348/152 |
| 2008/0152236 | A1 * | 6/2008 | Vendrig et al. | 382/224 |
| 2009/0060278 | A1 | 3/2009 | Hassan-Shafique et al. | |
| 2009/0141940 | A1 * | 6/2009 | Zhao et al. | 382/103 |
| 2009/0161982 | A1 * | 6/2009 | Tico et al. | 382/275 |
| 2009/0290020 | A1 * | 11/2009 | McLeish et al. | 348/143 |
| 2011/0038535 | A1 * | 2/2011 | Wang | G06T 7/2006 382/164 |
| 2011/0043699 | A1 * | 2/2011 | Springett et al. | 348/571 |
| 2011/0150280 | A1 * | 6/2011 | Tsuji | 382/103 |
| 2012/0027248 | A1 * | 2/2012 | Feris et al. | 382/103 |
| 2012/0106856 | A1 * | 5/2012 | Gupta et al. | 382/224 |

(Continued)

FOREIGN PATENT DOCUMENTS

EP   1978470 A1   10/2008

Primary Examiner — Michael Osinski
(74) Attorney, Agent, or Firm — Canon U.S.A., Inc. IP Division

(57) ABSTRACT

Disclosed is a method of storing a scene model (230) used for foreground/background separation of a scene (223) captured by a camera (100), the scene model comprising a plurality of visual element models (240) each associated with a set (250) of mode models (260, 270, . . . ), said method comprising determining (330) if a change in the scene satisfies a pre-determined threshold (MFGT), creating (710) a background image based on a plurality of the mode models classified as background, matching (360) an input image (210) captured by the camera and the background image by determining a similarity score, and updating the set of mode models if the similarity score satisfies a pre-determined similarity threshold by creating at least one mode model based on the received input image, said mode model being classified as background.

22 Claims, 11 Drawing Sheets

(56) References Cited

U.S. PATENT DOCUMENTS

| | | | |
|---|---|---|---|
| 2012/0183177 A1* | 7/2012 | Ku et al. | 382/103 |
| 2012/0275649 A1* | 11/2012 | Cobb | G06K 9/00771 382/103 |
| 2013/0002865 A1* | 1/2013 | Pakulski et al. | 348/143 |
| 2013/0011049 A1* | 1/2013 | Kimura | 382/155 |
| 2013/0071032 A1* | 3/2013 | Nishino | 382/195 |
| 2013/0101208 A1* | 4/2013 | Feris et al. | 382/164 |
| 2013/0265419 A1* | 10/2013 | Bulan et al. | 348/143 |
| 2014/0056519 A1* | 2/2014 | Gupta | G06T 7/0081 382/173 |

* cited by examiner

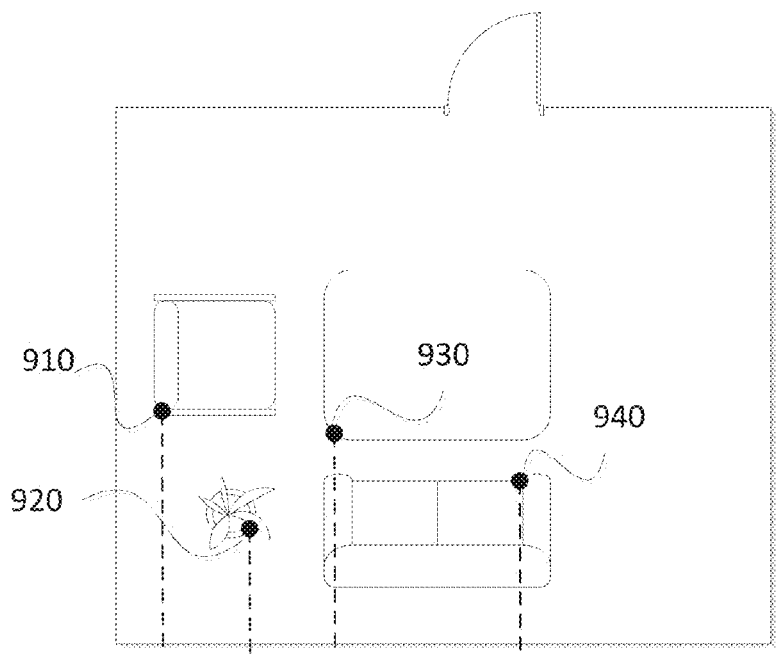
From 640 in Fig. 6
Fig. 9A
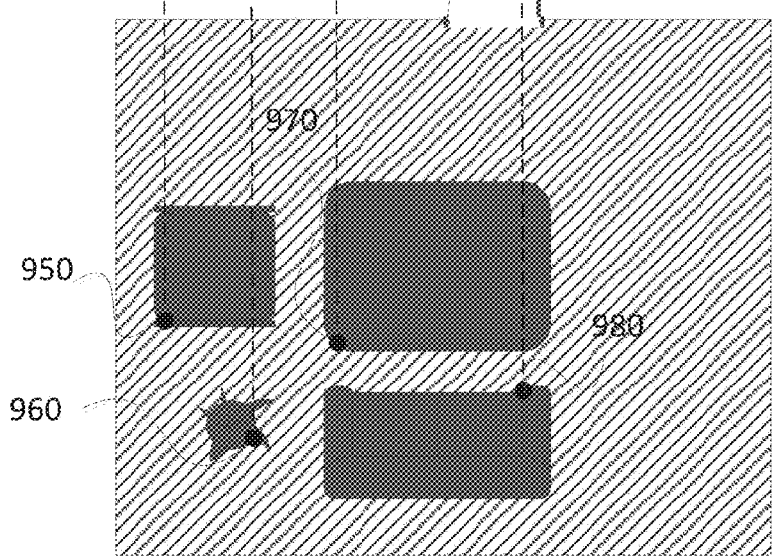
From 640 in Fig. 6
Fig. 9B
Fig. 9

METHOD AND SYSTEM FOR ROBUST SCENE MODELLING IN AN IMAGE SEQUENCE

CROSS-REFERENCE TO RELATED PATENT APPLICATIONS

This application claims the right of priority under 35 U.S.C. §119 based on Australian Patent Application No. 2011265429, filed 21 Dec. 2011, which is incorporated by reference herein in its entirety as if fully set forth herein.

TECHNICAL FIELD OF THE INVENTION

The current invention relates to video processing and in particular, to a method and system for the maintenance of a multi-appearance scene model for an image sequence.

BACKGROUND

A video is a sequence of images (also referred to as "frames") that may be encoded and compressed by various methods including motion-JPEG (M-JPEG) or according to the H.264 standard. The terms 'frame' and 'image' are used throughout this specification interchangeably to describe a single image in an image sequence. An image is made up of visual elements such as pixels or 8×8 DCT (Discrete Cosine Transform) blocks as used in JPEG images in a motion-JPEG stream.

The purpose of creating a scene model is to enable foreground objects and static background of a scene viewed by a camera to be distinguished. The real world environment is dynamic. As a result, a scene model developed from the camera input image may vary over time. For example, the overall lighting in the scene captured by a camera can change, and for example objects can enter, move around or leave the scene.

A scene model maintained by a computer system may be subjected to large environmental changes that affect the captured image. Such rapid changes can occur, for example, due to lights turning on or off in a room. Since rapid lighting changes affect the captured images in the scene, the effect on updating a scene model are correspondingly great. For instance, with typical parameter settings a large part of a scene, due to said rapid lighting changes, will likely be determined to be foreground for several minutes, causing any software that uses the output of the scene model to behave in an erroneous manner.

One method to improve the stability of scene models is to adjust the luminance level of the input image. However, in general luminance compensation techniques do not help to improve the stability of a scene model in a rapid lighting change situation. This is because luminance compensation only helps when there is gradual lighting change in the scene.

In another method, heuristic rules are employed in which, if the total percentage of detected foreground pixels in the scene is greater than a specified threshold value, the whole scene is temporarily treated as background, or in other words, no objects in the scene are classified as foreground objects. This approach however makes no distinction between rapid global lightings and a real large foreground object standing in front of the camera which is capturing the scene.

Thus, a need exists for an improved method for foreground background (FG/BG) separation using a scene model.

SUMMARY

It is an object of the present invention to substantially overcome, or at least ameliorate, one or more disadvantages of existing arrangements.

Disclosed are arrangements, referred to as Feature Space Switching (FSS) arrangements, which seek to address the above problems by selecting between different feature spaces depending upon the proportion of foreground picture elements detected in the image of interest.

According to a first aspect of the present invention, there is provided a method of distinguishing foreground and background of a scene captured in an image sequence by a camera by maintaining a scene model comprising a plurality of visual element models each being associated with a set of mode models, said method comprising the steps of:

determining if a change in the scene satisfies a pre-determined threshold;

creating a background image based on a plurality of the mode models classified as background;

matching an input image captured by the camera and the background image by determining a similarity score based on a plurality of feature points in the input image and the background image; and updating the set of mode models if the similarity score satisfies a pre-determined similarity threshold by creating at least one mode model based on the received input image, said mode model comprising the plurality of visual elements, said at least one created mode model being classified as background.

According to another aspect of the present invention, there is provided an apparatus for implementing any one of the aforementioned methods.

According to another aspect of the present invention there is provided a computer program product including a computer readable medium having recorded thereon a computer program for implementing any one of the methods described above.

Other aspects of the invention are also disclosed.

BRIEF DESCRIPTION OF THE DRAWINGS

At least one embodiment of the present invention will now be described with reference to the following drawings, in which:

FIGS. 9A and 9B illustrate an example of the matched features found in the scene when lights are turned off.

DETAILED DESCRIPTION

Figure 1:
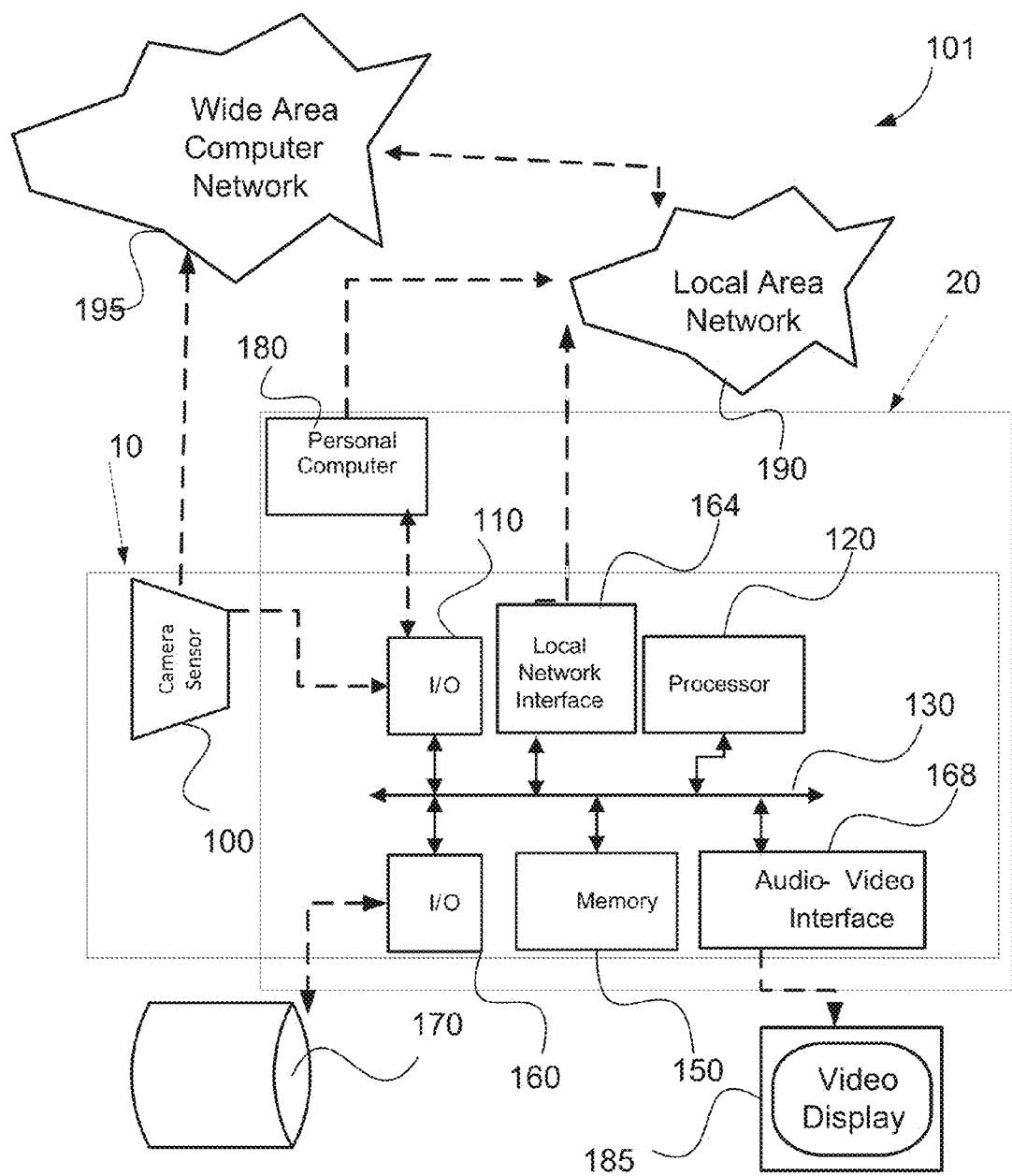
FIG. 1 shows a network camera for implementing the global luminance adjustment method.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above that relate to prior art arrangements relate to discussions of documents or devices which may form public knowledge through their respective publication and/or use. The inventor(s) and/or the patent applicant(s) do not represent, by such discussions, that such documents or devices in any way form part of the common general knowledge in the art.

FIG. 1 shows a network camera 101 for implementing the disclosed composite scene modelling method. Sensors 100 are used to obtain the images of the image sequence. The sensors may represent a stand-alone sensor device (i.e. detector or a security camera) or be part of an imaging device, such as camera, mobile phone etc. The remaining electronic elements 110 to 168 may also be part of the imaging device comprising camera sensors 100, as indicated by dotted line 10. The electronic elements 110 to 168 may also be part of a computer system that and is located either locally or remotely with respect to sensors 100. In the case indicated by dotted line 20, electronic elements form a part of personal computer 180.

The transmission of the images from the camera sensors 100 to the processing electronics 120 to 168 is facilitated by an input/output interface 110, which could be a serial bus compliant with Universal Serial Bus (USB) standards and having corresponding USB connectors. Alternatively, the image sequence may be retrieved from camera sensors 100 via Local Area Network 190 or Wide Area Network 195. The image sequence may also be downloaded from a local non-transitory storage device (e.g. 170), that can include SIM card and SD card.

The images are obtained by input/output interface 110 and sent to a non-transitory computer readable memory medium 150 or another of the processing elements 120 to 168 via a system bus 130. The processor 120 is arranged to retrieve the luminance data of the sequence of images from sensors 100 or from memory 150. The processor 120 is also arranged to fetch, decode and execute all steps of the disclosed method. The processor 120 then records the results from the respective operations to memory 150, again using system bus 130. Apart from memory 150, the output could also be stored more permanently on a storage device 170, via an input/output interface 160. The same output may also be sent, via network interface 164, either to a remote server which may be part of the network 190 or 195, or to personal computer 180, using input/output interface 110. The output may also be displayed for human viewing, using Audio-Video (AV) interface 168, on a monitor 185. Alternatively, the output may be processed further. One example of further processing may include using the output data, written back to memory 150, memory 170 or computer 180, as the input to a scene modelling system.

As was discussed above and indicated in FIG. 1, the above method may be embodied in various forms. In the particular form, indicated by rectangle 10 in FIG. 1, the method is implemented in an imaging device, such as a camera or a mobile phone with a camera. In this case all the processing electronics 110 to 168 will be part of the imaging device, as indicated by rectangle 10. As already mentioned in the above description, such an imaging device for capturing a sequence of images and adjusting the luminance values of the visual elements in at least some of the captured images will comprise: a sensor 100, memory 150, a processor 120, an input/output interface 110 and a system bus 130. The sensor 100 is arranged for capturing data of the luminance values of a plurality of visual elements of each image in the sequence of images.

The memory 150 is used for storing the luminance values of each image in the sequence of images captured by the sensor and previously determined previous luminance compensation value, previous compensation adjustment value and previous luminance compensation direction. The processor 120 is arranged for receiving, from the sensor 100 or from the memory 150, the stored luminance values of each image in the sequence of images and the stored previous luminance compensation value, previous compensation adjustment value and previous luminance compensation direction. The processor 120 hypothesizes a number of possible luminance compensation scenarios and computes a brightness count and a darkness count for each of the hypothesized scenarios. The processor 120 does that by performing a comparison of the luminance value of a block in the input image and a block in the scene model in the corresponding location.

Further, the processor 120 is arranged for determining the current luminance compensation direction based on a cost function, which produces the lowest cost of all the hypothesized scenarios. Basing on the result of such cost function, a winning scenario is selected; hence for the current frame, the final compensation direction, compensation adjustment value and luminance compensation value are chosen. Next, the processor applies the determined final luminance compensation value to the luminance value of each block in the current input frame. The input/output interface 110 facilitates the transmitting of the luminance data from the sensor 100 to the memory 150 and to the processor 120, while the system bus 130 transmits data between the input/output interface 110 and the processor 120.

Figure 2:
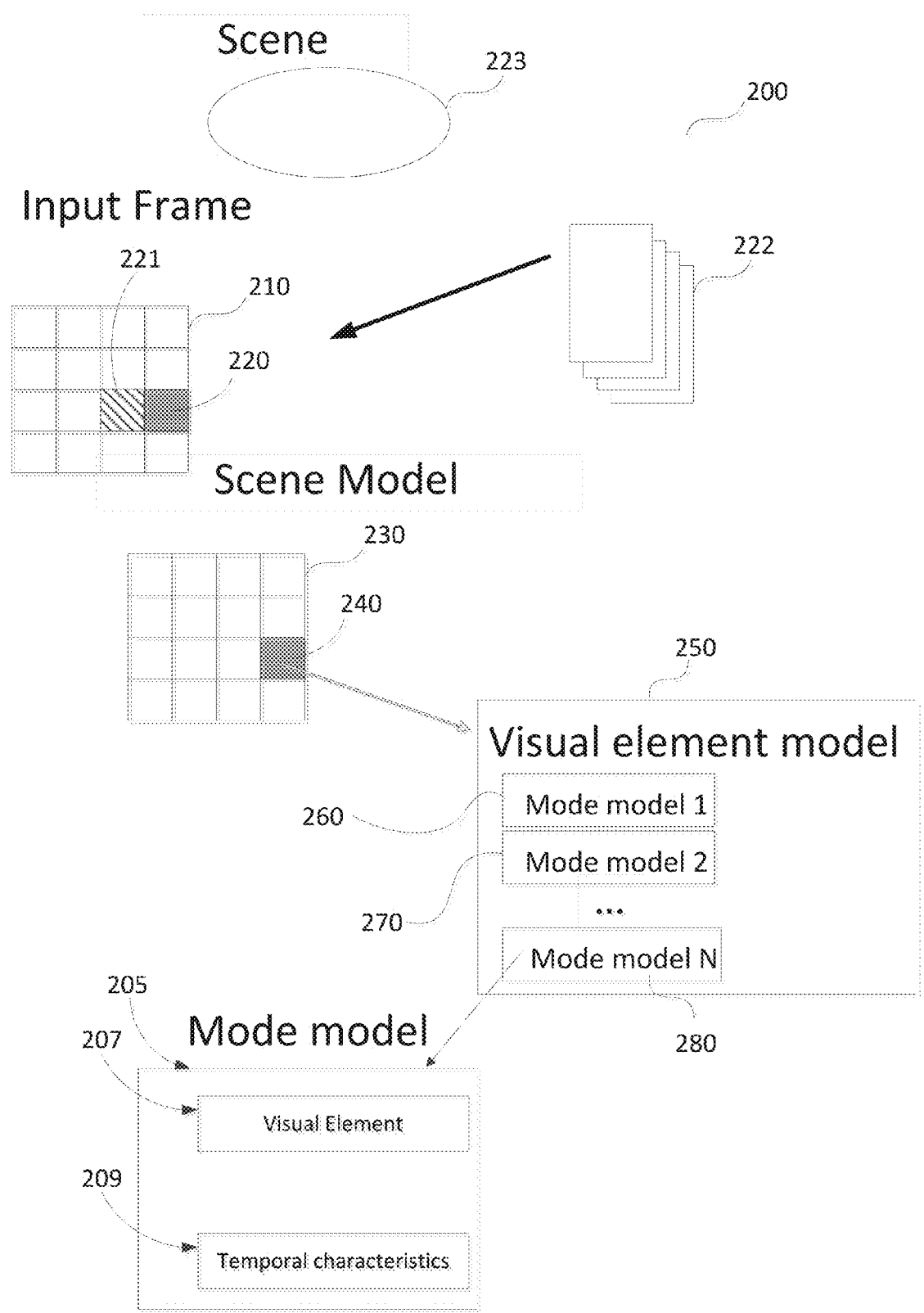
FIG. 2 is a block diagram of a scene model consisting of local element models.

FIG. 2 shows a schematic representation of an input frame 210 that includes a plurality of visual elements such as 220. A visual element is an elementary unit in regard to which processing takes place, and the visual element is captured by an image sensor such as the camera 100. A visual element may be, for example, a pixel or an 8×8 Discrete Cosine Transform (DCT) block. FIG. 2 also shows a schematic representation of a scene model 230 that includes a plurality of visual element models such as 240. In the example shown, the input frame 210 includes an example 220 of a visual element and the scene model 230 includes an example 240 of a visual element. In one FSS arrangement, the scene model 230 is stored in the memory 150 of the camera 101. In one FSS arrangement, the processing is performed by the processor 120 of the camera 101.

The scene model 230 includes a number of visual element models such as 240. For each input visual element 220 that is modelled, a corresponding visual element model 240, 250 is maintained. Each visual element model such as 240 includes a set of one or more mode models such as 260. There can be several mode models corresponding to the same location in the captured input frame 210. Each mode model such as 260, 270, . . . , is based on a history of values for the corresponding visual element 240. The visual element model 240, 250 includes a set of mode models that includes mode model 1 (i.e. 260), mode model 2 (i.e. 270), . . . , mode model N (i.e. 280).

A mode model such as 205 further contains visual element 207 and temporal characteristics 209. Each mode model such as 205 corresponds to a different state or appearance of the corresponding visual element 240. For example, if there is a flashing neon light in the scene, then the mode model 1 (i.e. 260) represents, a "background", the mode model 2 (i.e. 270) represents, a "foreground", such as a part of a passing human, and the mode model N (i.e. 280) represents another "foreground", such as part of a passing car. In one arrangement, the mode model is the mean value of pixel intensity values. In another arrangement, the mode model is the median or the approximated median of observed DCT coefficient values for each DCT coefficient, and the mode model records temporal characteristics.

As indicated above, various FSS arrangements may equally be practised on a device with an embedded processor, such as the camera of FIG. 1.

Figure 3:
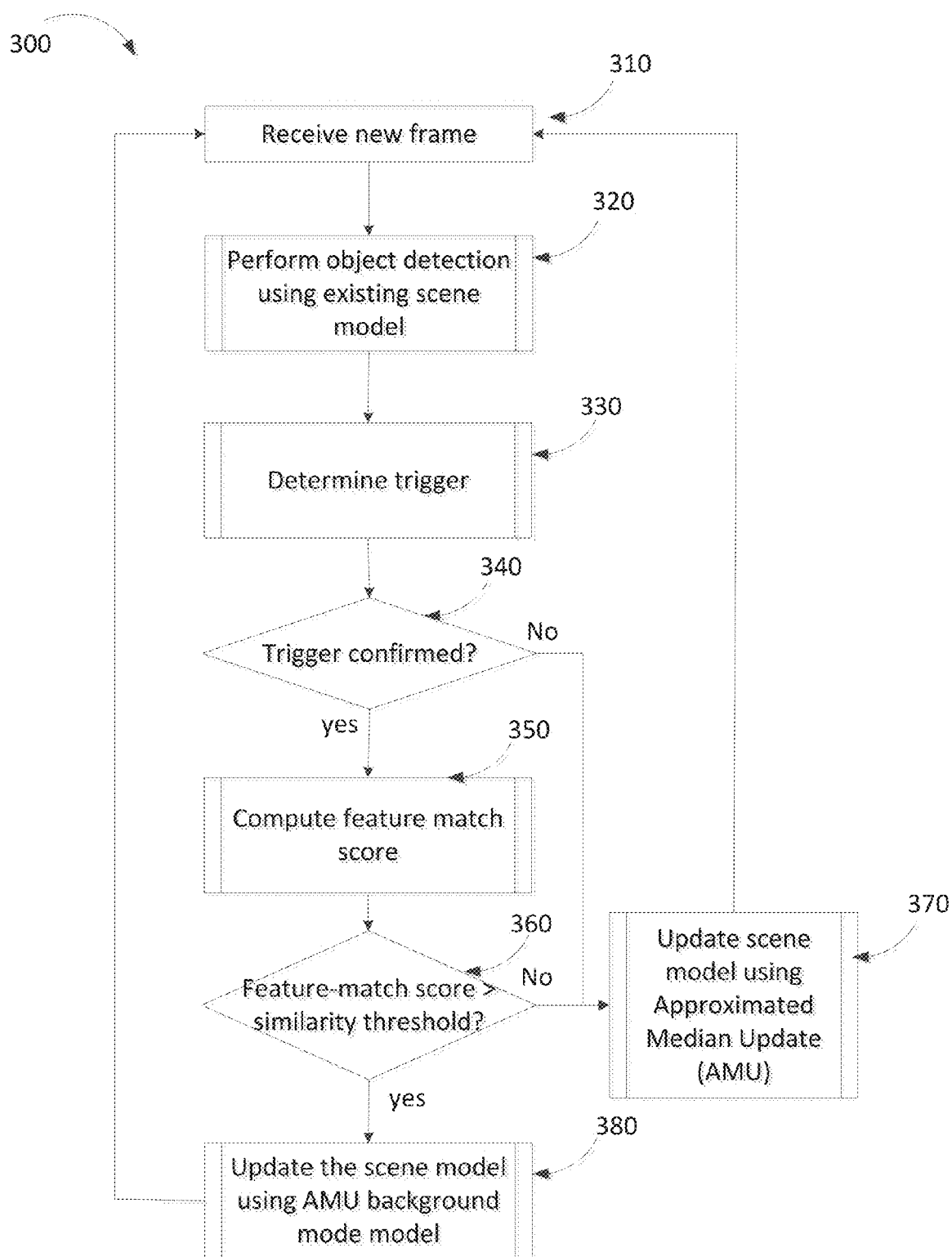
FIG. 3 is a flowchart of the composite scene modelling method in a video object detection process.

FIG. 3 is a schematic flowchart illustrating a method of multiple feature based scene modelling. In a first receiving step 310, a new frame is captured by the sensor 100. Then, at a subsequent processing step 320, object detection is performed using an existing scene model by the processor 120. The object detecting step 320 is further described hereinafter in regard to FIG. 4.

Figure 4:
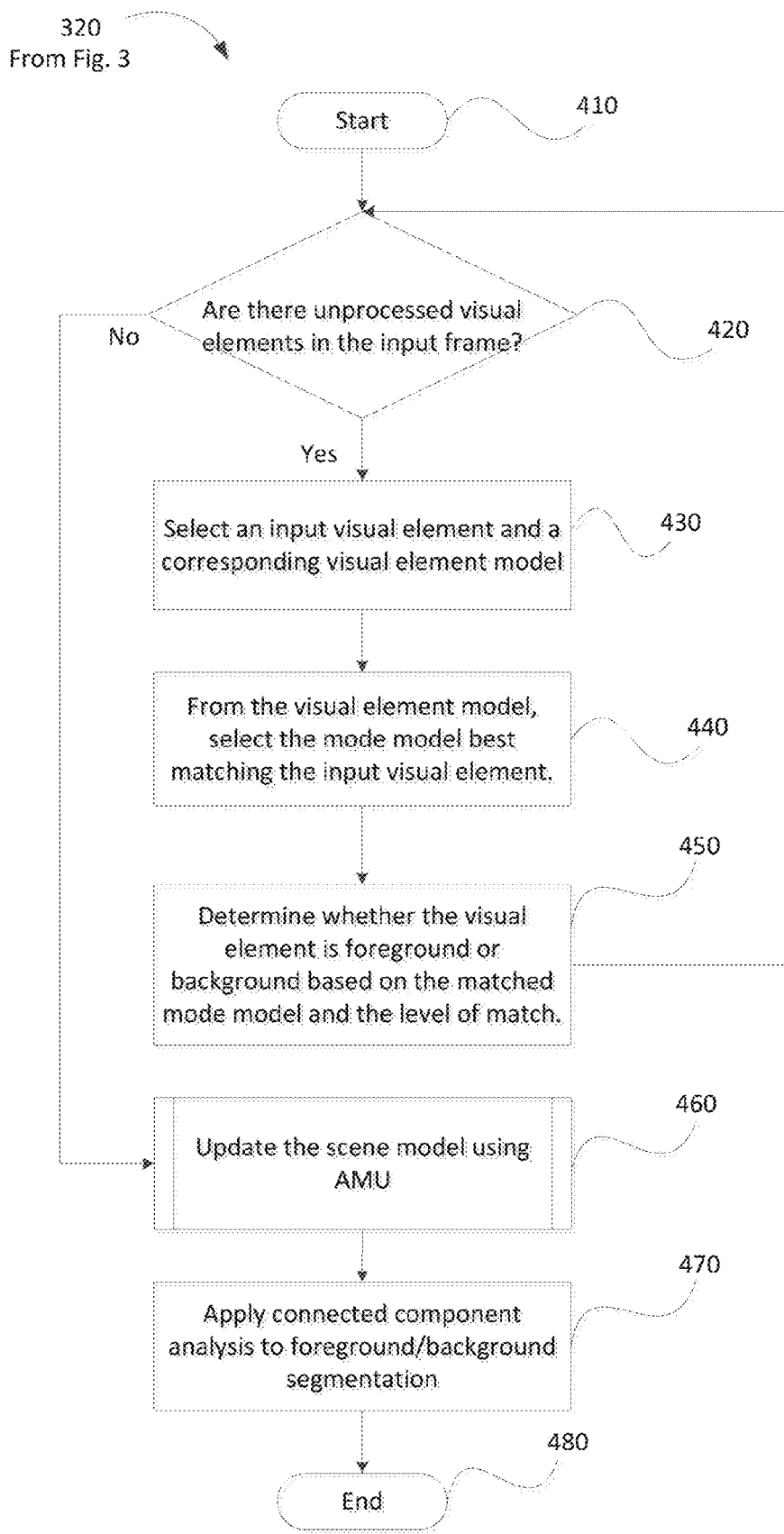
FIG. 4 is a flowchart of a process for determining the foreground background status of all the element models in the scene model.

FIG. 4 provides an example of how the process 320 in FIG. 3 can be performed. FIG. 4 is a flow diagram illustrating a process 400 for an overall approach to perform scene modelling for object detection.

Scene modelling involves the modelling of the visual content of a scene, based on an image sequence depicting the scene. Scene modelling allows a video analysis system to distinguish between (transient) foreground objects and (non-transient) background, using a background-differencing operation.

In one example, including a camera with a fixed field of view, the scene model 230 may be the first frame of an image sequence, based on the assumption that the first frame is known to contain non-transient content only. Background-differencing is then performed by subtracting a later frame in the image sequence from the scene model to classify portions of the scene as foreground or background. Regions of an image that are different to the scene model are classified as foreground and regions of an image that are similar to the scene model are classified as background. The definitions of "different" and "similar" depend upon the scene modelling method being used.

In another example of a scene model, the frames depicting a scene comprise 8×8 DCT (Discrete Cosine Transform) blocks associated with each position (such as 220) in the scene. For each position, several mode models 205 are maintained. The mode models relate to different visual content 207 of the 8×8 blocks encountered at the same (spatial) scene position but at different (temporal) points in the image sequence. If a block in a new incoming frame is similar to an existing mode model, the existing mode model can be updated. If the block in a new incoming frame is different to all existing mode models for the scene position, a new mode model is created and initialised with the values of the block in the new incoming frame.

By keeping track of the temporal characteristics 209 of a mode model 205 and a count of the update frequency of the mode model 205, a decision can be made as to whether a mode model represents foreground or background. For example, if the time that has passed since a particular mode such as 205 was created is greater than a predetermined threshold value, then the mode 205 may be classified as background. Otherwise, the mode is classified as foreground.

In another example, a mode is classified as background if the mode was updated more times than a threshold value. If this is not the case, the mode is classified as foreground.

The comparison between a block such as 220 and a mode model such as 205 is based on similarity rather than an exact match. The reason is that the captured representation of the real world varies even when the real world is constant. In addition, there can be small variations in the visual appearance of the real world while there is no semantic change in the scene. For example, a change in lighting changes the visual appearance of objects captured by a sensor.

An example of background-differencing using a block/mode model similarity comparison method is the calculation of the weighted sum of the differences between modelled DCT coefficients 207 and DCT coefficients of the block 220. The weighted sum is then compared to a threshold to determine whether the modelled DCT coefficients are similar to the DCT coefficients of the block or not.

Scene modelling systems may incorporate techniques to update a scene model based on a latest observed image. The update techniques allow scene modelling systems to cope with structural changes in the scene, e.g. a new painting in a museum will initially be detected as a foreground object, but after some time the painting becomes part of the background. The same update techniques allow scene-modelling systems to deal with lighting changes. Temporarily the regions affected by luminance changes are considered to be foreground, but after a while the regions become background again.

The process of object detection is sometimes referred to as foreground/background separation. The terms object detection and foreground/background separation are used interchangeably in the description. The separation process 400 begins at a Start step 410, which receives an input frame such as 210. Control passes to a subsequent decision step 420 to determine whether any visual elements 220 of the input frame 210, such as pixels or blocks, are yet to be processed. If there are more visual elements such as 220 to be processed, then control passes from the step 420 via a YES arrow to a step 430, which selects a visual element such as 220 for further processing and identifies a corresponding visual element model such as 240.

Control then passes to a comparing step 440, which compares the visual element 220 from the input frame 210 against the mode models such as 260, 270, . . . , in the visual element model 250 corresponding to the visual element 220 that is being processed, in order to select a closest-matching mode model such as 260, to be known as the matched mode model. Control then passes to a determining step 450, which determines whether the visual element such as 220 that is being processed represents foreground or background, based on the properties of the mode model such as 260 that was selected by the step 440, and further based on a match (i.e. a measure of the similarity) between the visual element 220 and the mode model such as 260. Next, control passes from the step 450 and returns to the step 420 to determine whether there are any more visual elements to be processed.

If at the step 420 there are no more visual elements in the input frame to be processed, then the FG/BG separation process is complete at the visual element level and control passes from the step 420 to a step 460 via a NO arrow. After processing all the visual elements has been completed, the step 460 then updates the scene model 230 according to the determined matched mode model for each visual element determined by the step 440. The step 460 is described hereinafter in more detail in regard to FIG. 10. Control passes from the step 460 to a subsequent step 470, which performs post-processing steps, which may include, for example, applying connected component analysis on the FG/BG separation results using standard techniques, such as flood fill. Other post-processing steps may include, for example, removing small connected components, or morphological filtering of the segmentation result. After the step 470, control passes to an End step 480 and the process 400 ends with respect to the input frame. The process may optionally be repeated for other frames in the sequence.

As described above, the step 440 selects a matching mode model. There are various methods that may be used to select a matching mode model. One such method compares the input visual element 220 to each of the mode models such as 260 in the visual element model 250 corresponding to that input visual element 220. First, the similarity score between the input visual element 220 to a mode model such as 260 is determined based on the weighted sum of the differences between the DCT coefficients of the mode model and the input visual element 220. Then, in the exemplary arrangement, the mode model with the highest similarity score is selected as the matching mode model.

Figure 5:
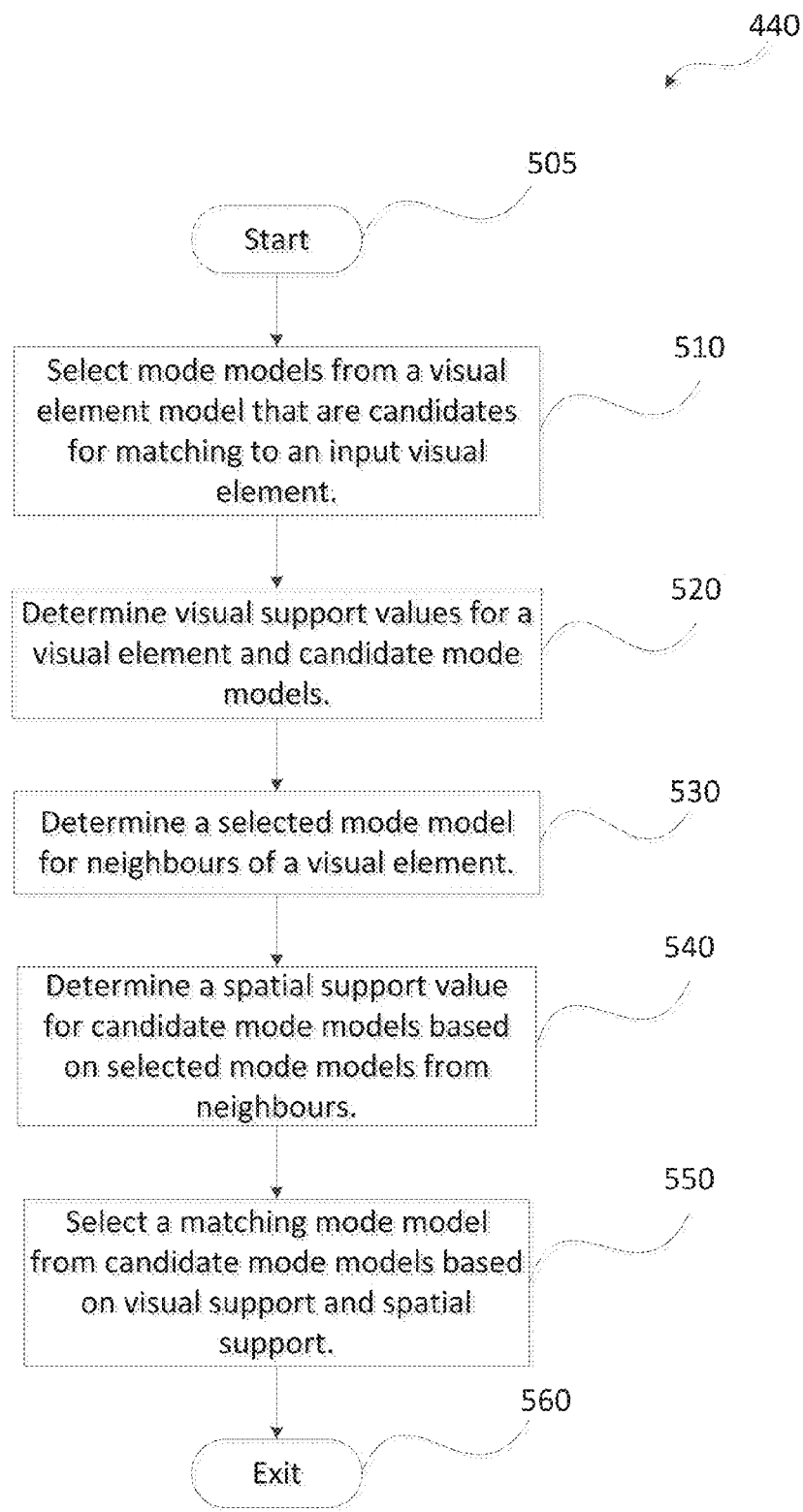
FIG. 5 is a flowchart of a process for selecting a matching mode model in an element model.

In another arrangement, the first mode model with a similarity score within a predefined threshold is selected as the matching mode model. The value of the predefined threshold can be 2.5 standard deviations of the similarity score of this mode model. The latter method is useful in an implementation in which computing a similarity is an expensive operation. An alternative method utilises more than one match criterion to obtain more than one type of match, and then utilises the match type to determine a later process or mode model for a process to act upon. For example, separate matches are made for an intensity pattern match, and for an overall brightness match. FIG. 5 explains a preferred FSS arrangement for selecting a matching mode model.

One aspect of a FSS arrangement, as depicted in the step 440 in FIG. 4, is determining the similarity between the input visual element and a mode model. For simple scene models 230, such as a mean intensity representation, the computation of similarity is straightforward. For more complex scene models determining similarity is more complex. For example, when the visual element 220 is an 8×8 block with DCT coefficients, similarity needs to be defined over multiple variables. One method for determining similarity utilises machine learning techniques to map multi-dimensional input values to one probability value, indicating the probability that a mode model such as 260 matches the input visual element such as 220. Such machine learning techniques may include, for example, Support Vector Machines and Naïve Bayes classifiers.

The selection of a matching mode model such as 260 based purely on the information in the visual element such as 220 is sensitive to noise in the input signal. This can be reduced by taking into account the context, such as by considering spatially neighbouring visual elements such as 221. The goal of object detection is to find objects that are sufficiently visible to span multiple visual elements. Therefore, when one visual element is found to be foreground, it is reasonable to expect that there are other foreground visual elements in the neighbourhood of that visual element. If there are no foreground visual elements in the neighbourhood of that visual element, it is possible that the visual element in question should not be determined to be foreground.

Visual elements that are part of the same object are not necessarily visually similar. However, visual elements that are part of the same object are likely to have similar temporal characteristics. For example, if the object is moving, all visual elements associated with that object will have been visible only for a short period. In contrast, if the object is stationary, all visual elements will have been modelled for a similar, longer period of time.

FIG. 5 is a flow diagram of the process 440 for selecting a matching mode model, based on temporal characteristics. The process 440 acts on each visual element such as 220 and begins at a Start step 505. Control passes to a following step 510, which selects candidate mode models such as 260 from a visual element model such as 250 corresponding to the visual element such as 220 being processed, for matching to the input visual element 220 that is being processed. Next, control passes to a subsequent step 520 to determine visual support values for the visual element 220 and candidate mode models 260. The support value indicates what contribution the visual similarity makes to determining a mode model match.

In one FSS arrangement, a probability of matching is used as visual support value. In another FSS arrangement, a fixed point approximation of probability of matching is used as visual support value.

Control passes from the step 520 to a following step 530, which applies the same matching mode model selection process from the step 520 to find matching candidates for neighbours of the input visual element 220. After determining visual support for a candidate mode model, control passes to a following step 540 to determine spatial support. Spatial support is the support given from the matched candidates of the neighbours. Finally, control passes to a following step 550, which selects a matching mode model from the candidate mode models. For each candidate mode model, the spatial support and the visual support are combined to compute a mode model matching score. In one FSS arrangement, the mode model matching scores are combined by adding them after applying a weighting function:

Mode_model_matching_score=$w_v$·Visual_Support+ $w_s$·Spatial_Support

Spatial_Support is the total spatial support given to the candidate mode model. Weight $w_v$ indicates the importance of the visual support, say 0.5, and weight $w_s$ indicates the importance of the total spatial support, say 0.5. Note that the weight can be used to normalise the support values. In one example, $w_s$ is set to one (1).

In one arrangement, the mode model matching score is computed for each candidate mode model, and the candidate mode model with the highest mode matching score is selected as the matching mode model corresponding to the input visual element 220. In another arrangement, a mode matching threshold value, say four (4) is used. The mode matching score is computed for candidate mode models until a mode matching score exceeds the threshold. That is, the match is with a candidate mode model that is good enough, rather than necessarily the best mode model.

Control passes from the step 550 to a following Exit step 560 and the processing of a visual element terminates. It will be appreciated that any number of other visual elements may be processed in a similar fashion.

Figure 10:
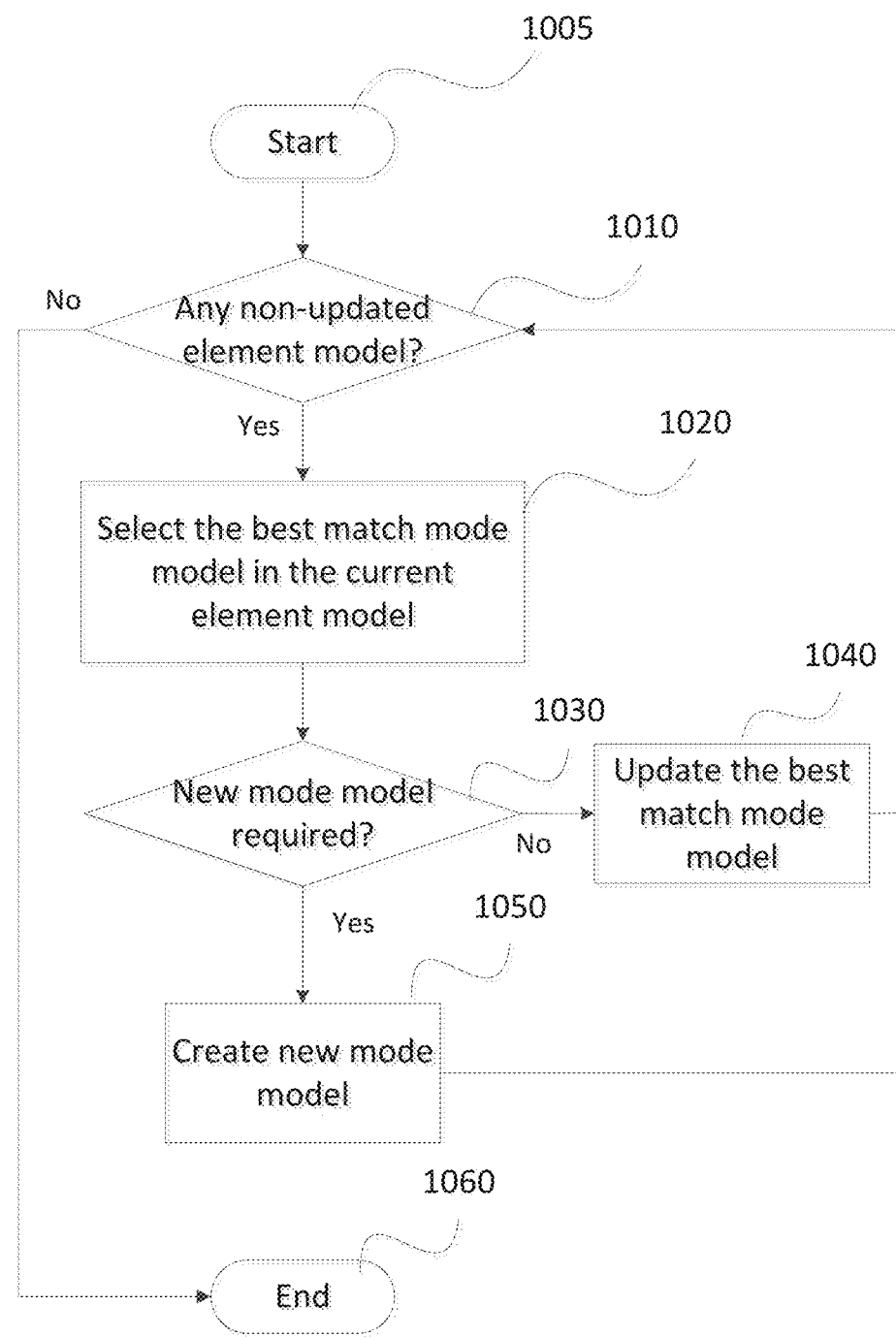
FIG. 10 is a flow chart for updating a scene model using Approximated Median Update method.

FIG. 10 is a flow diagram of the process 460 for updating a scene model using the Approximated Median Update (AMU) method. The AMU process 460 begins at a Start step 1005, which receives a scene model. A following decision step 1010 determines if there are any more element models 250 which need to be updated. If this is not the case, then control flows from the step 1010 via a NO arrow to step a 1060 that ends the process.

If however the step 1010 returns a logical "TRUE", then control flows from the step 1010 via a YES arrow to a following step 1020, in which the previously determined best matching mode model at the step 440 is selected for the current element model. Then at a following decision step 1030, the visual elements and temporal characteristics of the best matched mode model are examined. If the value of the best mode model matching score from step 550 exceeds the mode matching threshold value, the creation of a new mode model is required and control flow goes from the step 1030 via a YES arrow to a following step 1050, in which a new mode model is created for current element model. Control then passes from the step 1050 to the step 1010. In the exemplary arrangement of the step 1050, the value of the temporal characteristics 209 of the newly created mode model is initialised to zero and the visual features 207 in the input image 210 at the corresponding element model location are copied into the newly created mode model. An example of a temporal characteristic of a mode model is the activity count. The activity count is the number of times this mode model is considered to be representative for the input visual element.

Returning to the step 1030, if the value of the best mode model matching score from step 550 does not exceed the mode matching threshold value, then control flows from the step 1030 via a NO arrow to a step 1040, in which the best match mode model is updated. The update of a mode model consists of two parts, updating the temporal characteristics 209 and updating the visual elements 207. Control then flows from the step 1040 to the step 1010.

In the preferred arrangement for updating the temporal characteristics 209 of a mode model 205, the values of the temporal characteristics are incremented by a predetermined increment step, for example, the activity count is incremented by the value 1.

In the exemplary arrangement for updating the visual elements 207 of a mode model, the following equation is used.

$$C_v^{t+1} = f(C_v^t, C_I, LR)$$

where, $C_v^t$ denotes the coefficient value at time t for visual element set v which is used in the match determining step 520, $C_v^{t+1}$ represents the updated mode coefficient value which will be used for scene matching in the next frame (at time t+1), $C_I$ represents the coefficient of the corresponding input element in the input frame and f represents the approximated median updating function.

Returning to the method 330 in FIG. 3, following the step 320, in a following step 330, the processor 120 under control of the FSS software, determines a trigger to temporarily switch to a different feature space for scene modelling dependent upon a condition. Using the object detection method 320 as depicted in detail in FIG. 4, the input mode models of the input image are compared with the mode models of the scene model in the exemplary arrangement. In one implementation of the arrangement, the mode models are in the frequency domain as previously described. In other words, the input image is first matched with the scene model using a frequency domain based technique, and a trigger indicating that the input image is significantly different from the scene model is triggered by the frequency domain based technique. The trigger determining process 330 is described hereinafter in more detail in regard to FIG. 6. In one arrangement, the process 330 of determining a trigger is performed for every frame. In another arrangement, the process 330 of determining a trigger is performed for every Nth frame, say N=100.

Figure 6:
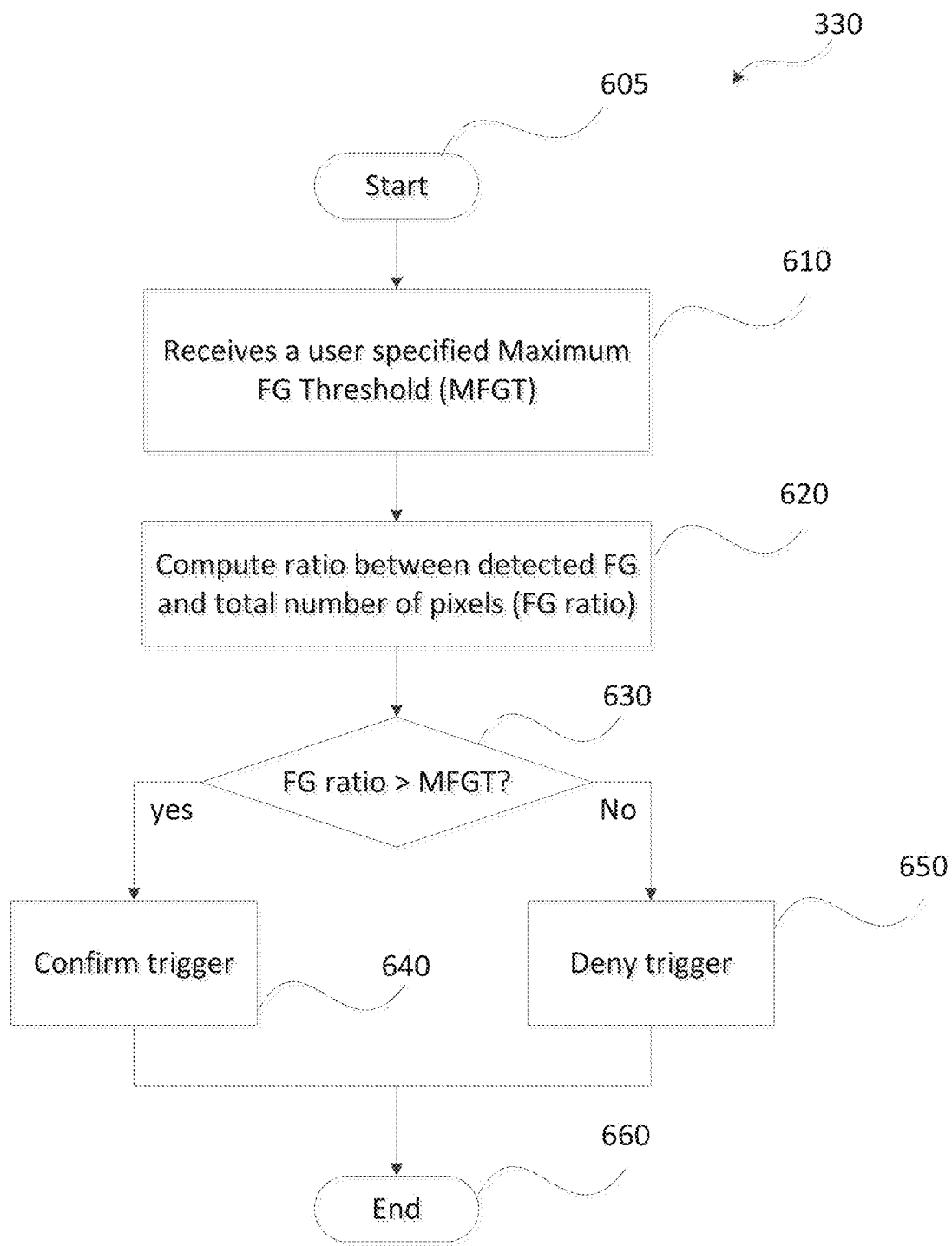
FIG. 6 is a flow chart of the process for determining a trigger to temporarily switch to a different feature space for scene modelling.

FIG. 6 depicts an example of the determining process 330 in FIG. 3. The process 330 begins at a Start step 605. Control then passes to a step 610, which receives a user specified Maximum ForeGround Threshold (MFGT) value and stores this in the memory 150. The value of the MFGT threshold is a measure of how much of a scene is detected as foreground, and is a percentage value, i.e., zero to one hundred percent, say 70%.

Next at a following step 620, the percentage of detected foreground pixels, referred to as FG ratio, is determined. The FG ratio is the amount of detected FG pixels divided by the total number of pixels in a frame.

Next in a following determining step 630, the FG ratio is compared with the MFGT value by the processor 120. If the value of the FG ratio is greater than MFGT, then control passes from the step 630 via a YES arrow to a step 640, the trigger confirming step. An example of this situation is depicted in FIGS. 9A and 9B. The process 330 then is directed to an END step 660.

FIG. 9A is a background image (BGI) from a scene model which is modelling the top down view of a lounge area in the scene model 230. The term "background image" is sometimes referred to as a "scene image", and the terms background image and scene image are used interchangeably throughout the description.

FIG. 9B is the input image from a top down view of the same lounge area at the same view point captured when lights are turned off. When the scene is initially transitioned in FIG. 9B, due to a large lighting change, a large foreground ratio is detected when compared with the scene model in FIG. 9A, and a trigger is confirmed.

Returning to FIG. 6, if the FG pixel ratio is not greater than the maximum foreground threshold MFGT, the control flows from the step 630 via a NO arrow to step a 650, the trigger denying step. The process 330 then is directed to the END step 660.

The step 660 passes the status of the trigger is passed to a determining step 340 in the process 300 in FIG. 3.

Returning to FIG. 3, at the examining step 340, if the trigger is not confirmed, then control flow follows a NO arrow from the step 340 to a subsequent updating step 370, in which the scene model is updated using the Approximated Median Update (AMU) method, previously described in relation to FIG. 10. Control then flows from the step 370 to the step 310.

Returning to FIG. 3, at the examining step 340, if the trigger is confirmed, then control flow follows a YES arrow from the step 340 to a subsequent step 350 that determines the feature matching score between the background image extracted from the scene model and the input image. The term feature matching score is also referred to as similarity score, the terms feature matching score and similarity score being used interchangeably in the description. The method of determining feature match score is described hereinafter in more detail in regard to FIG. 7. In the exemplary arrangement, the input image is matched to the scene model using another method that is different to the previously described frequency domain based technique. In one particular implementation, the similarity score is calculated by determining feature matches between the input image and the BGI (created from the scene model) in the pixel domain.

Figure 7:
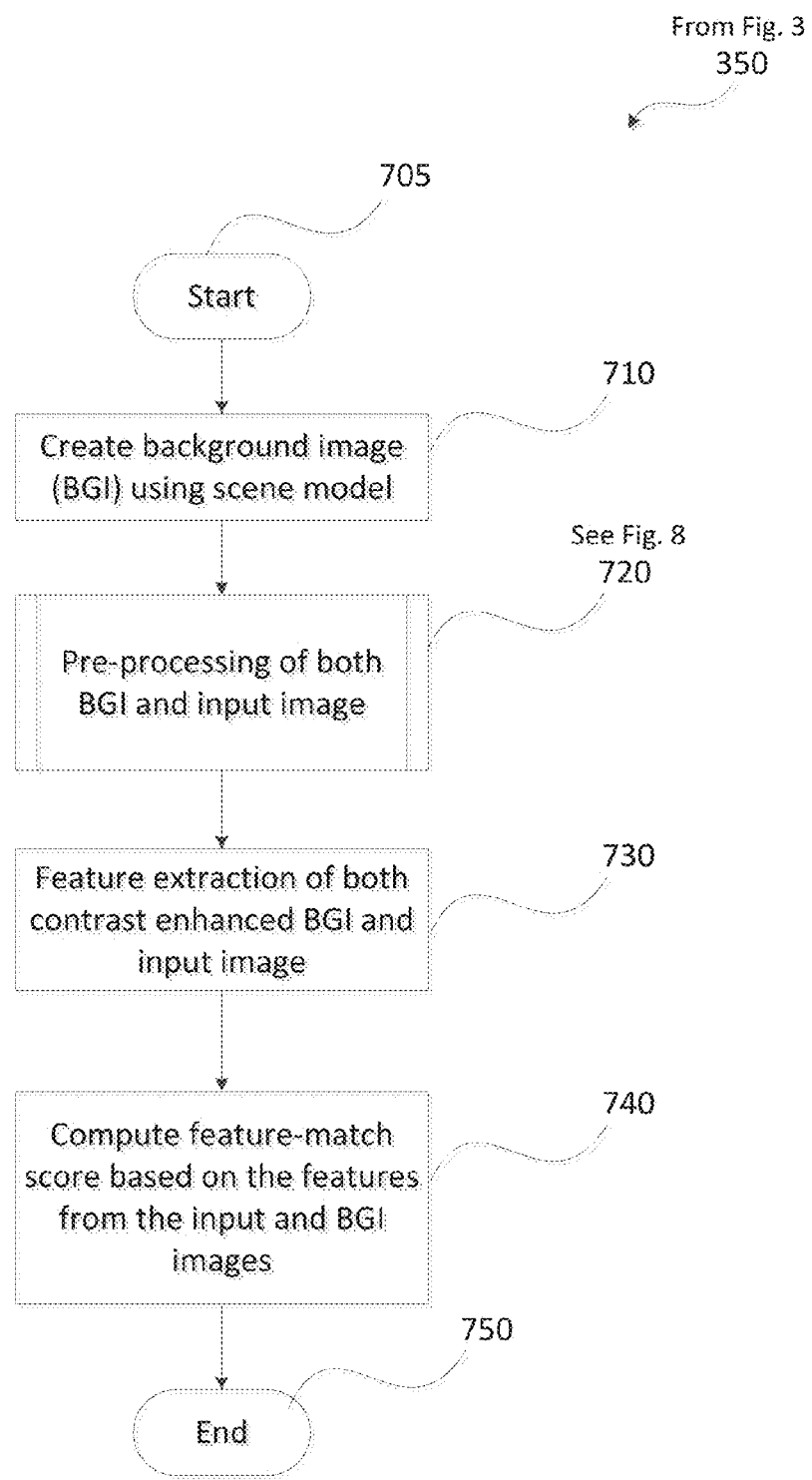
FIG. 7 is a flow chart of the process for computing feature-match score between the background image derived from scene model and the input image.

FIG. 7 depicts an example of how the process 350 in FIG. 3 can be performed. FIG. 7 is thus a flow diagram illustrating the process 350, which determines the feature match score. The match score determining process 350 starts at a step 705, in which the current scene model is received and stored in the memory 120. Next a subsequent creating step 710 creates a background image from the scene model using the processor 150.

In the exemplary arrangement of creating a background image in pixel space from the scene model in the step 710, the oldest background mode model 260 is selected at each element model location 240 in the scene model 230 to form a representative background image. The oldest background mode model is the mode model having the earliest creation time. Next, still in the step 710, an inverse transform process is performed to convert the representative background image into a background image. For example, if the mode models in the representative background image comprise DCT coefficients, then the inverse DCT process is used as the inverse transformation.

Next at a following step 720, both the background image in pixel space and the input image in pixel space are contrast enhanced. An example of a contrast enhancement process of an image is described hereinafter in more detail in regard to FIG. 8.

Returning to the step 720, after both the BGI and the input image are contrast enhanced, a following step 730 extracts a plurality of features from both of the contrast enhanced BGI and the input image. In the exemplary arrangement, histograms of oriented gradients are extracted from both the pre-processed BGI and the input image in step 720.

Next at a following step 740, a feature match score is computed based on the features extracted from both the pre-processed BGI and input image. In the exemplary arrangement, the similarity function is expressed in the following equation:

$$K(X, Y) = \frac{1}{|X||Y|} \sum_{x \in X} \sum_{y \in Y} k(x, y)$$

where, K(X,Y) denotes the similarity function used for X and Y SIFT features.

Moreover, X represents the number of feature vectors extracted from pre-processed BGI and Y represents a set of feature vectors extracted from the input image. The local similarity function k(x, y) measures the similarity between a feature vector x in the set X and a feature vector y in the set Y. Finally, |X| denotes the cardinality of X features and |Y| denotes the cardinality of the set Y.

In the exemplary arrangement, the local similarity function k(x, y) is further expanded in the following equation:

$$k(x, y) = e^{\frac{-d^2(x,y)}{\sigma^2}}$$

Where, e is the exponential function which incorporates a distance measure d(x, y) and a scaling factor σ. In this arrangement, the distance measure d(x, y) can be further expanded using the following equation:

$$d(x, y) = \sqrt{\sum_{i=1}^{D} (x_i - y_i)^2}$$

Where, D denotes the total number of features in a feature vector, $x_i$ denotes the i-th feature value in the feature vector x and $y_i$ denotes the i-th feature value in the feature vector y. In one arrangement, the value of D is set to 64. In an alternative arrangement, the value of D is set to 32. In summary, the higher similarity between two images, the higher the feature-match score.

The process 360 then terminates with a step 750.

FIGS. 9A and 9B depict an example of the features extracted from both the BGI and input image.

FIG. 9A shows four features extracted from the BGI, namely 910, 920, 930, and 940 representing a corner of a chair, a corner of a plant, a corner of a table and a corner of a two seater couch respectively.

FIG. 9B shows four features extracted from the input image, 950, 960, 970 and 980 representing the corner of chair, the corner of the plant, the corner of the table and the corner of the two seater couch. FIGS. 9A and 9B show a one-to-one matching between the feature points. For example, the feature point 910 matches to the feature point 950, the feature point 920 matches to the feature point 960, the feature point 930 matches to the feature point 970 and the feature point 940 matches to the feature point 980, resulting in the highest possible feature match score, i.e., 1.

Figure 8:
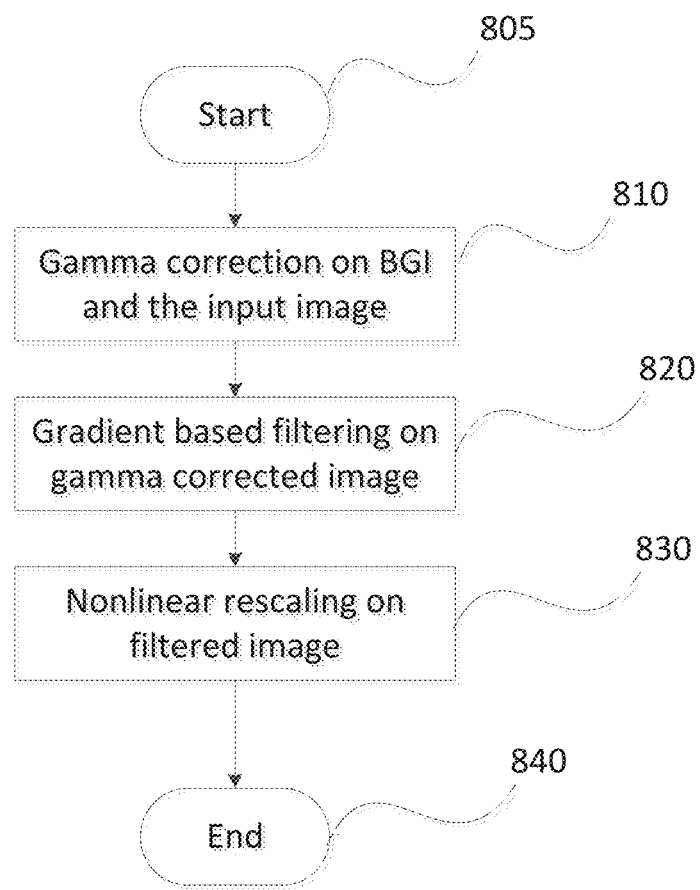
FIG. 8 is a flow chart for the preferred FSS arrangement pre-processing of both input image and scene model derived background image.

FIG. 8 depicts an example of the contrast enhancing process 720. FIG. 8 is a flow diagram illustrating the process 720, which performs pre-processing on an image. In the preferred arrangement, contrast enhancement is performed on both the BGI and input image in order to extract features which are robust to rapid lighting change. The process starts at a step 805, which receives an image to be contrast enhanced. Next at a following step 810, gamma correction is performed on the image, and the following equation is used:

$$I_\gamma(X) = (I(X))^\gamma, X = \{x, y\}$$

Where, X represents the location of a pixel (x, y) in an image, and I(X) denotes the value of image at that pixel location X. $I_\gamma(X)$ denotes the gamma corrected value for I(X) and it is computed from $(I(X))^\gamma$. In one arrangement, the value of γ is set to 0.2.

After an image is gamma corrected, a gradient based filtering process is performed on the gamma corrected image using the following equations at a following step 820. The following equation is used:

$$I_d(X) = (H_1(y) * I_\gamma(X)) - (H_2(y) * I_\gamma(X))$$

Where, $I_d(X)$ denotes the result of the gradient based filtering process at pixel location X, in order to extract high frequency components from images, and $I_d$ represents the resulting image of the gradient based filtering process. * is the symbol for convolution, and $(H_1(y)*I_\gamma(X))$ represents the process of applying the filter $H_1(y)$ on $I_\gamma(X)$, where $H_1(y)$ is further defined as:

$$H_1(y) = \exp\left(-\frac{y^2}{\sigma_1^2}\right), \text{ where } \sigma_1 = 1 \text{ and } y \in [-2, -1, 0, 1, 2]$$

The above equation illustrates the parameter values set for the filter $H_1(y)$ in the exemplary arrangement, where $\sigma_1$ in the exponential function $$\exp\left(-\frac{y^2}{\sigma_1^2}\right)$$

and is set to the value of one and y is a value in a five by five matrix ranging between −2 to 2. $(H_2(y)*I_\gamma(X))$ represents the process of applying the filter $H_2(y)$ on $I_\gamma(X)$, where $H_2(y)$ is further defined as:

$$H_2(y) = \exp\left(-\frac{y^2}{\sigma_2^2}\right), \text{ where } \sigma_2 = 2 \text{ and } y \in [-2, -1, 0, 1, 2]$$

The above equation illustrates the parameter values set for the filter $H_2(y)$ in the exemplary arrangement, where $\sigma_2$ in the exponential function $$\exp\left(-\frac{y^2}{\sigma_2^2}\right)$$

is set to the value of two and y is a value in a five by five matrix ranging between −2 to 2.

Next at a following rescaling step 830, the filtered image from step 820 are rescaled using the following equations:

$$I_n(X) = \alpha \times \tanh\left(\frac{1}{\alpha} \times \frac{I_d(X)}{\sqrt[\lambda]{\frac{1}{N}\sum_{n=1}^{N}|I_d(n)|^\lambda}}\right) \text{ where } \lambda = 0.1, \alpha = 15$$

The above equation demonstrates a non-linear rescaling process where $I_d(X)$ is the value at pixel location X in the filtered image. And the $$\sqrt[\lambda]{\frac{1}{N}\sum_{n=1}^{N}|I_d(n)|^\lambda}$$

represents a normalisation factor over the whole filtered image, in which $I_d(n)$ represents the value at pixel location n. In the exemplary arrangement, the value of λ is set to 0.1 and the value of α is set to 15. The above equation is repeated at every pixel location in the filtered image $I_d$.

Finally the values of $I_n(X)$ at each pixel location X in the rescaled image $I_n$ is further normalised using the following equation:

$$I_N(X) = \frac{I_n(X) - \min_X(I_n(X))}{\max_X(I_n(X)) - \min_X(I_n(X))} \times M$$

Where, $$\min_X(I_n(X)) \text{ and } \max_X(I_n(X))$$

denotes the minimum and the maximum value of $I_n$ at every pixel location X. M is the scaling factor and in the preferred FSS arrangement, is set to 255. At a result of the preferred FSS arrangement, the values of $I_n(X)$ at each pixel location X is normalised in the range of 0 to 255.

The process 720 then terminates in a step 840. Turning back to the score determining step 360 in FIG. 3, if the feature match score, which is determined in the step 740, is not greater than the similarity threshold, then control goes via a NO arrow to a step 370, where the processor updates the scene model using method A, which is described in FIG. 10. The update method of step 370 is the same as the update method used in step 460. In one arrangement, the similarity threshold value is set to 0.35. In other words, there is indeed a real foreground object appearing the scene causing a large ratio of foreground pixel detected by the camera when the match score exceeds the similarity threshold, meaning that that the BGI and the input image is sufficiently different. The process of updating scene model using method A is described in more detail in regard to FIG. 10.

Figure 11:
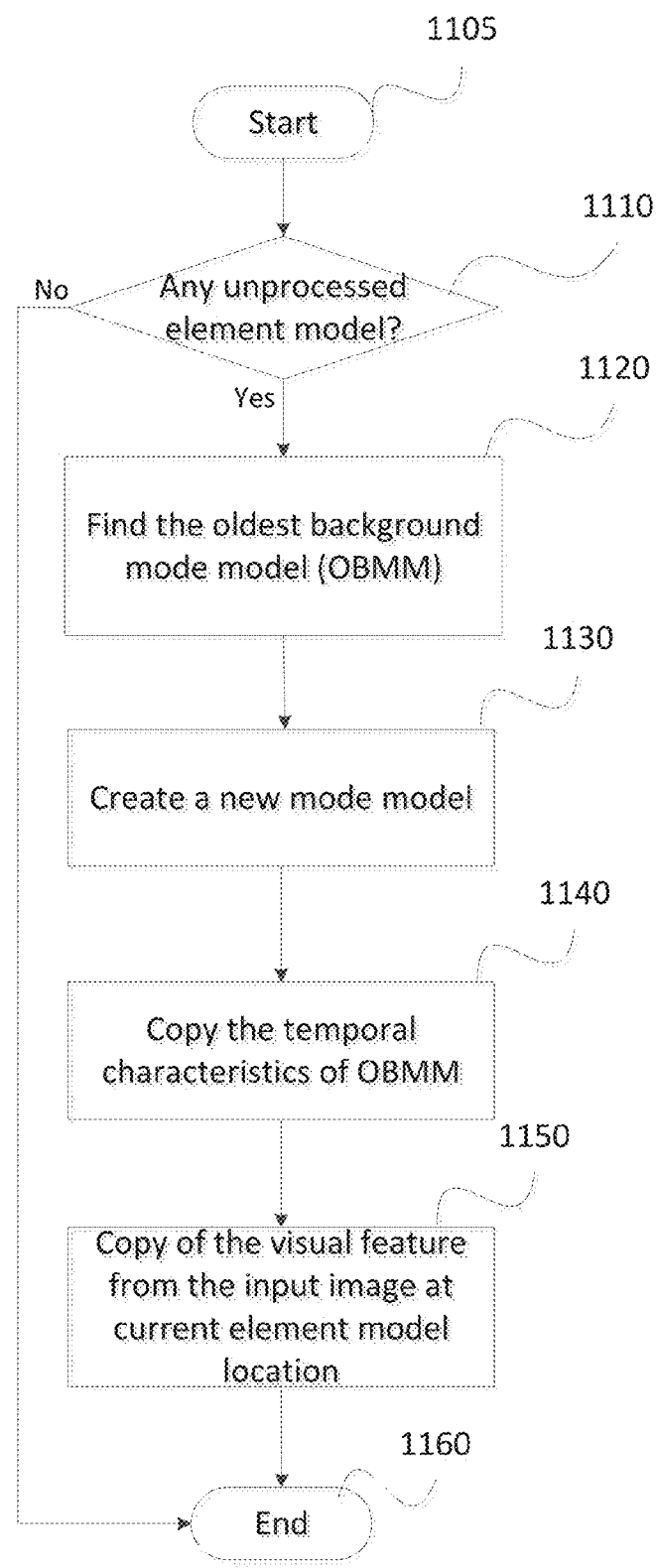
FIG. 11 is a flow chart for updating a scene model using Approximated Median Update background mode model update method.

However, if the feature-match score is greater than a similarity threshold value, meaning that the large amount of detected foreground pixel maybe due to rapid lighting change, control goes via a YES arrow from the step 360 to a step 380 which updates the scene model using method B, which is described in FIG. 11.

As depicted in FIG. 9, the scene, in terms of all the background elements, has not changed and all the feature points have a correct one-to-one matching between the input image and the BGI created from the scene model. As described previously in the step 350, rapid changes in lighting only results in high feature match score, hence the scene model will be updated using the "AMU background mode model update" method, which is update method B as described in FIG. 11.

FIG. 11 depicts an example of how the step 380 in FIG. 3 may be performed. FIG. 11 is a flow diagram of an example of the process 380 of updating a scene model using update method B ("AMU background mode model update"). The process 380 begins at a Start step 1105, which receives a scene model. A next decision step 1110 determines if there are any more element model 250 that need to be processed. If Not, then control flows from the step 1110 via a NO arrow to a step 1160 which terminates the process.

Returning to the step 1110, if there are unprocessed element models from the input image, then the control goes via a YES arrow from the step 1110 to a following step 1120, in which the background mode model corresponding to the unprocessed element model is selected. In other words, a mode model that is classified as background with the same location as the unprocessed element model is chosen. In the preferred FSS arrangement, the background mode model that has the earliest creation time is selected, although the background mode model with the highest hit count may be chosen as well in another implementation. Next, at a following model creating step 1130, a new mode model is created corresponding to the currently processed element model from the input image. Next, at a following copying step 1140, the temporal characteristics of the selected background mode model from the step 1120 is copied into the newly created mode model. Then, at a following transferring step 1150, the visual features of the input image at the current element model are copied into the newly created mode model so that the newly created mode model has visual characteristics similar to those of the visual element after the lighting change.

However, the temporal characteristics of the newly created mode model are the same as a mode model that has been classified as a background mode model. In other words, the newly created mode model is also classified as a background mode model. The scene after the lighting change is not detected as foreground because there exists a background mode model that describes the scene after the lighting change, be it from a light switching on or a light switching off. After the step 1150, control passes to the end step 1160 and the process 370 ends with respect to the input frame.

INDUSTRIAL APPLICABILITY

The described method is applicable to the imaging and data processing industries and particularly for the imaging applications associated with capturing and processing sequences of images. The described method has the advantage of accurate video object detection, including detection of foreground, in scenarios where rapid large lighting changes happen without the need to reset and reinitialise the model.

The foregoing describes only some embodiments of the present invention, and modifications and/or changes can be made thereto without departing from the scope and spirit of the invention, the embodiments being illustrative and not restrictive.

The claims defining the invention are as follows:

1. A method of storing a scene model used for foreground/background separation of a scene captured in an image sequence by a camera, said method comprising the steps of:
   creating a background image based on the scene model;
   determining whether a change in the scene is greater than a pre-determined foreground threshold;
   matching an input image captured by the camera and the background image, when the change in the scene satisfies the pre-determined foreground threshold, to determine a similarity score and comparing the determined similarity score to a pre-determined similarity threshold; and
   updating the scene model when the similarity score is greater than the pre-determined similarity threshold.

2. The method according to claim 1, wherein the similarity score is determined based on a plurality of feature points in the input image and the background image.

3. The method according to claim 1, wherein the background image is in pixel space.

4. The method according to claim 1, wherein the scene model is in frequency space.

5. The method according to claim 1, further comprising the step of:
   copying a temporal characteristic of one of a plurality of mode models classified as background in the scene model into a new mode model created in said updating step.

6. The method according to claim 1, further comprising the steps of:
   when the change in the scene does not satisfy the pre-determined foreground threshold, creating a mode model based on an input mode model from the input image in an event that similarity values between visual characteristics of the scene model and the input mode model are less than a separate similarity threshold.

7. A method according to claim 1, wherein at least one of the input image and the background image is contrast enhanced, said contrast enhancing step comprising the steps of:
   performing gamma correction on the image;
   performing gradient based filtering on the gamma corrected image; and
   performing nonlinear rescaling on the filtered image.

8. A camera comprising:
   an image sensor;
   a processor; and
   a non transitory storage memory medium storing an executable computer program for directing the processor to execute a method of storing a scene model used for foreground/background separation of a scene captured in an image sequence by a camera, said program comprising:
   software executable code for creating a background image based on the scene model;
   software executable code for determining whether a change in the scene is greater than a pre-determined foreground threshold;
   software executable code for matching an input image captured by the camera and the background image, when the change in the scene satisfies the pre-determined foreground threshold, to determine a similarity score and comparing the determined similarity score to a pre-determined similarity threshold; and
   software executable code for updating the scene model when the similarity score is greater than the pre-determined similarity threshold.

9. A non-transitory computer readable storage medium having a computer program recorded therein, the program being executable by a computer apparatus to make the computer perform a method of storing a scene model used for foreground/background separation of a scene captured in an image sequence by a camera, said method comprising the steps of:
   software executable code for creating a background image based on the scene model;
   software executable code for determining whether a change in the scene is greater than a pre-determined foreground threshold;
   software executable code for matching an input image captured by the camera and the background image, when the change in the scene satisfies the pre-determined foreground threshold, to determine a similarity score and comparing the determined similarity score to a pre-determined similarity threshold; and
   software executable code for updating the scene model when the similarity score is greater than the pre-determined similarity threshold.

10. A method according to claim 1, wherein the scene model comprises a plurality of visual element models each being associated with a set of mode models, the updating step comprising:
    selecting a previously determined best matching mode model for a current visual element model when the similarity score is not greater than the similarity threshold;
    when a value of a best mode model matching score exceeds a mode matching threshold value, creating a new mode model; and
    when the value of the best mode model matching score does not exceed the mode matching threshold value, updating the previously determined best matching mode model.

11. A method according to claim 1, wherein the scene model comprises a plurality of visual element models each being associated with a set of mode models, the updating step comprising:
    selecting a mode model having a same location as an unprocessed visual element model as a background mode model when the similarity score is greater than the similarity threshold;
    creating a new mode model corresponding to a currently processed visual element model from the input image; and
    copying visual features of the background mode model into the newly created mode model.

12. A camera according to claim 8, wherein the software code for updating further comprises: software executable code for selecting a previously determined best matching mode model for a current visual element model when the similarity score is not greater than the similarity threshold; software executable code for creating a new mode model when a value of a best mode model matching score exceeds a mode matching threshold value; and software executable code for updating the previously determined best matching mode model when the value of the best mode model matching score does not exceed the mode matching threshold value.

13. A camera according to claim 8, wherein the software code for updating further comprises:
   software executable code selecting a mode model having a same location as an unprocessed visual element model as a background mode model when the similarity score is greater than the similarity threshold;
   software executable code creating a new mode model corresponding to a currently processed visual element model from the input image; and
   software executable code copying visual features of the background mode model into the newly created mode model.

14. A non-transitory computer readable storage medium according to claim 9, wherein the software code for updating, when the similarity score is not greater than the similarity threshold, further comprises: software executable code for selecting a previously determined best matching mode model for a current visual element model when the similarity score is not greater than the similarity threshold; software executable code for creating a new mode model when a value of a best mode model matching score exceeds a mode matching threshold value; and software executable code for updating the previously determined best matching mode model when the value of the best mode model matching score does not exceed the mode matching threshold value.

15. A non-transitory computer readable storage medium according to claim 9, wherein the software code for updating further comprises:
   software executable code selecting a mode model having a same location as an unprocessed visual element model as a background mode model when the similarity score is greater than the similarity threshold;
   software executable code creating a new mode model corresponding to a currently processed visual element model from the input image; and
   software executable code copying visual features of the background mode model into the newly created mode model.

16. A method of storing a scene model used for foreground/background separation of a scene captured in an image sequence by a camera, said method comprising the steps of:
   creating a background image by detecting a region of the foreground and a region of the background in an input image captured by the camera based on the scene model;
   determining whether a ratio of a number of pixels of the detected foreground to a total number of pixels in the captured input image is greater than a predetermined foreground threshold or not;
   calculating a similarity score based on the captured input image and the background image, when the ratio of the number of pixels of the detected foreground to a total number of pixels in the captured input image is greater than the predetermined foreground threshold, and comparing the calculated similarity score to a predetermined similarity threshold; and
   updating the scene model when the calculated similarity score is not greater than the predetermined similarity threshold.

17. The method according to claim 16, wherein the similarity score is calculated by determining feature matches between the input image and the background image in the pixel domain.

18. A non-transitory computer-readable storage medium storing a readable program for operating a computer to execute a method according to claim 16.

19. The method according to claim 16, wherein the scene model is in frequency space.

20. The method according to claim 16, further comprising the step of:
   copying a temporal characteristic of one of a plurality of mode models classified as background in the scene model into a new mode model created in said updating step.

21. A method according to claim 16, wherein the scene model comprises a plurality of visual element models each being associated with a set of mode models, the updating step comprising:
   selecting a previously determined best matching mode model for a current visual element model in an event that the similarity score is not greater than the similarity threshold;
   when a value of a best mode model matching score exceeds a mode matching threshold value, creating a new mode model; and
   when the value of the best mode model matching score does not exceed the mode matching threshold value, updating the previously determined best matching mode model.

22. A method according to claim 16, wherein the scene model comprises a plurality of visual element models each being associated with a set of mode models, the updating step comprising:
   selecting a mode model having a same location as an unprocessed visual element model as a background mode model when the similarity score is greater than the similarity threshold;
   creating a new mode model corresponding to a currently processed visual element model from the input image; and
   copying visual features of the background mode model into the newly created mode model.

* * * * *